United States Patent [19]

Auffray et al.

[11] Patent Number: 5,617,222
[45] Date of Patent: Apr. 1, 1997

[54] CIRCUIT FOR ADAPTING FACSIMILE MACHINE TO BE CONNECTED TO A DATA TRANSMISSION LINE AND INCLUDING A DIFFERENTIAL AMP WITH TWO HIGH IMPEDANCE LINE INPUTS

[75] Inventors: Jean-Paul Auffray, Vaureal; Michel Mesure, Cerey, both of France

[73] Assignee: Societe D'Applications Generales D'Electricite et de Mecanique Sagem, France

[21] Appl. No.: 237,670

[22] Filed: May 4, 1994

[30] Foreign Application Priority Data

May 4, 1993 [FR] France .................... 93 05295

[51] Int. Cl.[6] ........................................ H04N 1/32
[52] U.S. Cl. ...................... 358/442; 358/446; 379/93
[58] Field of Search ...................... 358/406, 442, 358/443, 446; 379/100, 34, 93; 375/222

[56] References Cited

U.S. PATENT DOCUMENTS 4,149,030  4/1979  Foreman ........................ 379/93
4,788,714  11/1988  Hashimoto ..................... 379/100
5,018,189  5/1991  Kurosawa et al. ............... 379/93
5,473,676  12/1995  Frick et al. .................... 375/222

FOREIGN PATENT DOCUMENTS 380976   8/1990   European Pat. Off. .
454452   10/1991  European Pat. Off. .
497679   8/1992   European Pat. Off. .
2157918  10/1985  United Kingdom .
2242336  9/1991   United Kingdom .

*Primary Examiner*—Scott A. Rogers
*Attorney, Agent, or Firm*—Graham & James LLP

[57] ABSTRACT

A facsimile machine adapted to be connected to a data transmission line (19) which it shares with a terminal (18), comprising connecting means (1, 20, 40) adapted to be connected, at the input, to the line (19) and to transmit, to a data processing interface (80) of the facsimile machine, differential signaling signals of the line (19) in order, as a function of these signals, directly to connect the interface (80) to the line (19), in which the connecting means (1, 20, 40) comprise a differential amplifier (20) connected to the line (19) by two high-impedance inputs.

5 Claims, 1 Drawing Sheet

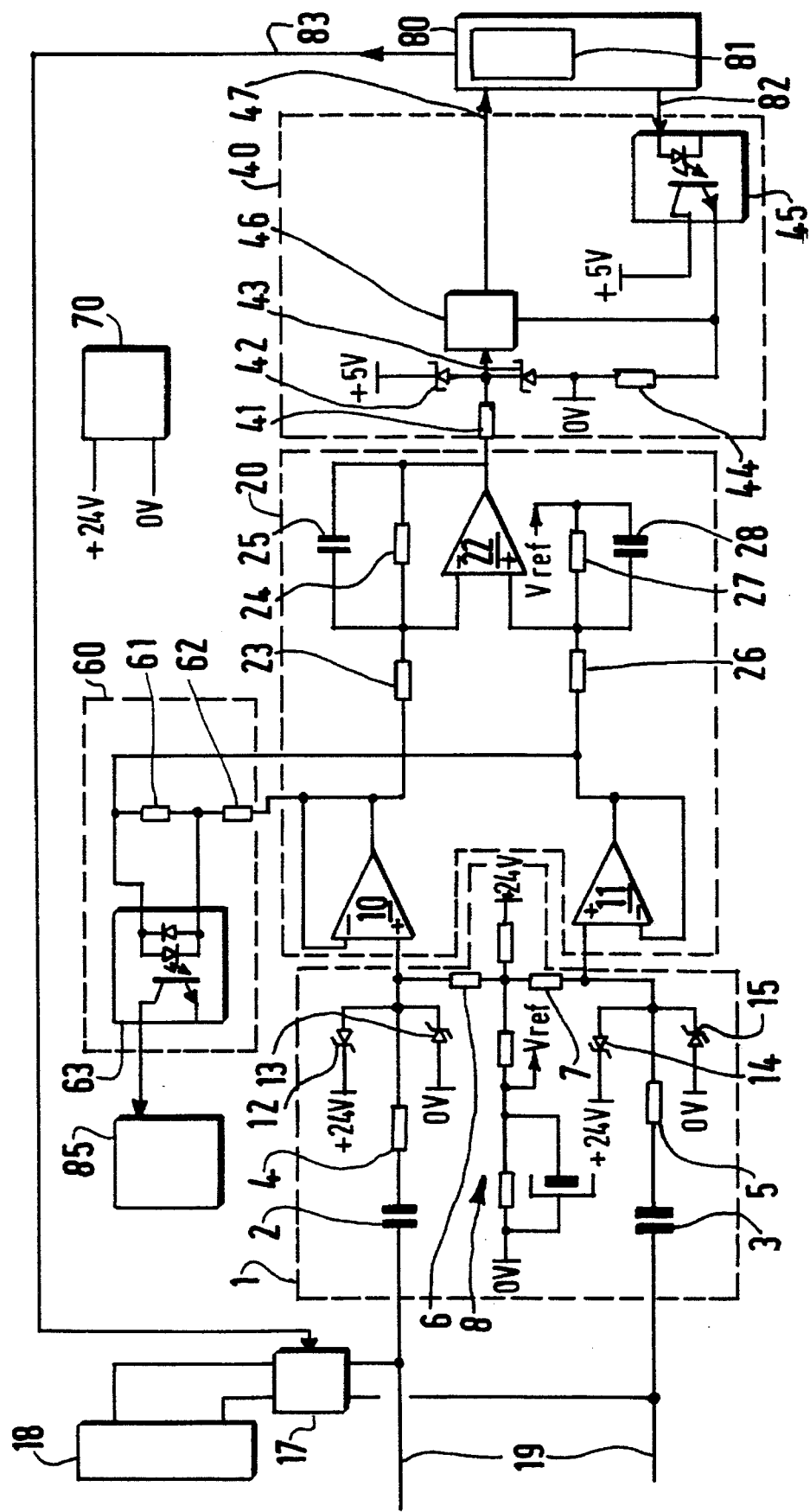

CIRCUIT FOR ADAPTING FACSIMILE MACHINE TO BE CONNECTED TO A DATA TRANSMISSION LINE AND INCLUDING A DIFFERENTIAL AMP WITH TWO HIGH IMPEDANCE LINE INPUTS

BACKGROUND OF THE INVENTION

The present invention relates to a facsimile machine adapted to be connected to a data transmission line which it shares with a terminal, comprising current limiting means adapted to be connected, at the input to the line and to transmit, to a data processing interface of the facsimile machine, differential signaling signals of the line in order to connect the interface directly with the line as a function of these signals.

A facsimile machine frequently shares with some other data reception terminal apparatus the use of a line of a telephone network to which it is connected. Such other apparatus may be a telephone answering machine connected, in the same manner as the facsimile machine, in parallel on the line, at the user of these apparatus. The cost of the connection to the telephone network is thus limited to the cost of a single line, but the telephone network no longer assures the switching of an incoming call to that one of the two apparatus which is concerned since there is only one telephone number.

Therefore, it is the calling apparatus which, after establishing a connection of by one of the machines, called "answering", must supply signaling signals which supplement the telephone number, such as, for instance an 1100 Hz frequency signal.

Thus, a calling facsimile machine gives off signaling signals in the form of an audible signal specific to a facsimile machine, which audible signal is detected by a listening or detection device of the facsimile machine called. The latter pre-empts by switching the incoming call to itself, connecting its modem (modulator-demodulator) to the line and, at the same time, actuating a switch in order to disconnect the answering machine from the line. In the absence of this specific audible signal, the answering machine, which answered the call, retains access to the line and handles the call, which is therefore a voice call.

However, the line is adapted to provide the signaling signals only to a single apparatus called. The other apparatus, in this case the facsimile machine, must therefore take up only a small part of the power present on the line in order not to weaken it and disturb the detection of it.

Therefore, for the phase of listening for the possible specific audible signal, prior to switching only the answering machine can "connect" in order to answer, and thus cause the sending of the specific audible signal, the facsimile machine being authorized to connect itself to the line only via its high-impedance listening device and not directly by its modem, which is low impedance.

It order to form the listening device, it is known to connect a transformer with high input impedance in parallel on the line. By differential effect, the transformer assures the rejection of the line voltages in common mode, that is to say, blocks the passage through its circuits of the voltages present equally on the two line wires, while it transmits the differential signaling signals, that is to say, signals which are measurable between the two line wires, to the modem, which is connected to its secondary.

This solution, however, is not satisfactory since the transformer has reduced impedance for the relatively low frequencies of the signaling signals. Although a transformer with windings having a large number of turns, which are bulky and costly, retains an impedance which is less reduced at low frequency, the impedance is however still sufficiently great to limit as desired the alternating current power taken from the line. It is therefore necessary to provide a switch in order, in the event of a call to the answering machine, to isolate the transformer from the line, so that it does not weaken the line signals when it is not active.

The present invention is directed at overcoming this drawback.

SUMMARY OF THE INVENTION

For this purpose, it concerns a facsimile machine of the type mentioned above, which is characterized by the fact that the current-limiting means comprise a differential power amplifier connected to the line by two differential high-impedance inputs.

Thus, the detection of the line signals requires only a slight removal of current or power, whatever their frequency. Taking the power just necessary for each input, which serves as impedance adapter buffer, the two signals on the two inputs of the amplifier are then combined downstream in differential manner, that is to say by subtraction, without the impedance of the circuits used for this operation, such as an operational amplifier, transformer or the like, being able to disturb the line.

The power amplifier advantageously comprises, at its input, two line amplifiers the outputs of which are connected to the two inputs of a differential output amplifier adapted to supply the signaling signals.

One can then, if necessary, connect line signals in common mode, for instance message accounting signals.

In particular, a ringing detector can be provided comprising an amplifier connected at its input to the two outputs of the line amplifiers in order to supply a ringing detection signal in response to the presence of a ringing voltage on the line.

The ringing detector is adapted to detect high voltages, although the output amplifier need detect only signals of moderate amplitude.

Furthermore, two capacitors are advantageously provided which are connected to the two line wires respectively in order to assure galvanic isolation between the line and the power amplifier.

One thus has a symmetrical connection on the two line wires, which improves the rejection of signals in common mode. Furthermore, in this case the power amplifier is then better protected from overvoltages coming from the line.

In order further to improve the protection against such overvoltages, there may furthermore be provided a direct current feed source, isolated from the line, in order to feed the power amplifier.

BRIEF DESCRIPTION OF THE DRAWING

The invention will be better understood on basis of the following description of the preferred embodiment of the facsimile machine of the present invention, read with reference to the sole FIGURE, which diagrammatically shows its circuits.

DETAILED DESCRIPTION OF THE INVENTION

The facsimile machine of the invention, which has not been shown in its entirety, is connected at its input to a line 19 of the switched telephone network by an adaptation circuit 1 forming part of a listening device 1, 20, 40 and 60 of the facsimile machine. The line 19 is also connected, via a controllable switch 17, to another data reception terminal, in this case a telephone answering machine 18. At its output, the adaptation circuit 1 is connected to the circuit 20, a differential amplifier, itself connected by one output to the circuit 40, the detector, and by two intermediate differential outputs to the circuit 60, which is the ringing detector.

A dc feed source 70 of +24 volts, referred to a ground potential OV, which is isolated from the line 19 and from the rest of the facsimile machine, feeds the above circuits. A +5 volt (+5 V) feed, not shown, is derived therefrom.

The adaptation circuit 1 has a symmetrical arrangement with respect to the two wires of the line 19. It comprises two capacitors 2, 3, each connected separately, on the one side to one of the line wires 19 and on the other side to a resistor 4, 5 in series with one end of another resistor 6, 7. The resistors 6, 7 are connected to each other at their other end and polarized at this point by a resistance dividing bridge 8 connected to the terminals of the source 70. The points common to the resistors 4 and 6 as well as 5 and 7 are connected respectively to two non-inverting inputs of high impedance of two amplifiers 10, 11 of the differential circuit 19, each of which is protected by a bridge consisting of two diodes, in this case zener diodes 12, 13 and 14, 15, connected as clipper by diode conduction towards the +24 V and ground respectively.

In the differential circuit 20, the two amplifiers 10, 11, which in this case are of the operational amplifier type connected in unit gain, are connected respectively at the output to two differential inputs of a differential amplifier 22 of the same type. Connected between the outputs of the amplifiers 10 and 22, a resistance dividing bridge 23, 24 is connected, at its intermediate point, to the inverting input of the amplifier 22, an integration capacitor 25 being in parallel with the resistor 24 between the inverting input and the output of the amplifier 22.

The non-inverting input of the amplifier 22 is associated with a dividing circuit 26, 27, 28 similar to the circuit 23, 24, 25, and connected between the output of the amplifier 11 and a fixed reference voltage $V_{ref}$, of a few volts, obtained on the division bridge 8 at the terminals of a capacitor of high value, to ground by its negative terminal.

The output of the amplifier 22 is connected to a terminal of an input series resistor 41 of the circuit 40, connected at its other terminal to a clipping bridge of 2 zener diodes 42, 43 by diode conduction to +5V and ground respectively.

A resistor 44 for bleeding to ground is connected to the emitter of the transistor of a photocoupler 45, the collector of which receives the voltage +5 V. The above emitter is also connected to a control input of an interface circuit 46, in this case a photocoupler. A data input of the circuit 46 is connected to the point common to the resistor 41 and the two zeners 42 and 43, while an isolated output belonging to the circuit 46 is connected to a modem 81 of a data processing interface 80 of the facsimile machine, recognizing the line signaling signals transmitted by the listening device. The processing circuit 80 controls the photocoupler 45 by a signal 82, and the switch 17 by a signal 83. It will be understood that an amplifier circuit of sufficiently low output impedance can be provided, in addition to or in place of the photocoupler 46, in order to supply sufficient power to the modem 81, provided that the galvanic isolation is assured.

The ringing detector circuit 60 comprises a resistor dividing bridge 61, 62 connected between the two outputs of the amplifiers 10 and 11. The input diode of a photocoupler 63 is connected in parallel to the resistor 61, while the output of the photocoupler 63 is connected to the input of a line management circuit 85 of the facsimile machine.

The operation of the facsimile machine and in particular of its listening device, will now be explained.

When a call arrives, the answering machine 18, which is connected to the line 19 by the switch 17 which is closed, answers the call, supplying an answer to the calling terminal, which, if it is a facsimile machine, will send out a specific audible signal.

The alternating current signals in common mode of the line 19 are only slightly amplified by the amplifiers 10, 11 since the source 70 is isolated from the line 19 and "floats".

The amplifier 22 receives at its two inputs the alternating current signals present on the two line wires 19, weakened by the division bridges 2, 4, 6 and 3, 5, 7 of the circuit 1, and transmits only the differential component. The remaining part of the common mode of the signals coming from the amplifiers 10, 11 is eliminated by the differential effect in the amplifier 22. Its output signal is read by the processing circuit 80 and under its control (82) via the circuit 46, then supplying a signaling signal 47.

The inputs of the amplifiers 10 and 11 being of high impedance, the circuit 1 has, in particular, a balancing purpose with respect to ground and also a purpose of protecting these inputs from overvoltages coming from the line 19. The series resistors 4, 5 of the adaptation circuit 1 are of a high value, although the alternating current taken from the line 19 is very slight. The resistor 6, 7 serves, together with the associated resistor 4, 5, to establish an attenuation ratio of the voltage applied to the input of the associated amplifier 10, 11 which is independent of the possible variations of the impedance of this input. As the latter is high, it is sufficient to select for the resistors 6 and 7 a slightly less high value which, in series with the resistor 4, 5, presents a high impedance on line.

As to the capacitors 2 and 3, they supplement the function of the resistors 4 and 5, thus assuring, for direct current, isolation from the line 19.

If the signaling signals 47 correspond to an audible signal specific to the facsimile machines, the processing circuit 80 brings about the direct connecting of its modem 81 to the line 19 by a connection, not shown. The modem 81 which received the alternating current line signals via the listening device 1, 20, 40, then receives them directly and, furthermore, can then transmit on the line 19. At the same time, the processing circuit 80 produces the signal 83, which has the effect of opening the switch 17 and isolating the answering machine 18 from the line 19. The signal 83 disappears at the end of the communication of the facsimile machine, which again connects the answering machine 18 to the line 19, at rest.

The ringing detector circuit 60 detects a small fraction of the ringing voltage at the terminals of the resistor 61, which serves as threshold circuit shunting the input diode of the photocoupler 63 and avoiding the exciting of it by the line voltages of low level, which do not exceed a few volts. The line management circuit 85 receives a corresponding signal and, upon the disappearance of this signal, transmits an activation signal to the circuit 80, indicating that it has answered the incoming call and that signaling signals corresponding to the specific audible signal can arrive at the modem 81 over the listening circuit.

What is claimed is:

1. A circuit for adapting a facsimile machine to be connected to a data transmission line (19) which it shares with a terminal (18), comprising connecting means (1, 20, 40) adapted to be connected, at the input, to the line (19) and to transmit, to a data processing interface (80) of the facsimile machine, differential signaling signals of the line (19) in order, as a function of these signals, to connect the interface (80) directly to the line (19), characterized by the fact that the connecting means (1, 20, 40) comprise a differential amplifier (20) connected to the line (19) by two inputs of high impedance.

2. A circuit according to claim 1, in which the amplifier (20) comprises, at the input, two line amplifiers (10, 11) the outputs of which are connected to the two inputs of an output differential amplifier (22) adapted to supply the signaling signals.

3. A circuit according to claim 2, in which there is provided a ringing detector (60) comprising an amplifier (63) connected, at the input, to the two outputs of the line amplifiers (10, 11) to supply a ringing detection signal in response to the presence of a ringing voltage on the line (19).

4. A circuit according to claim 1, in which there are provided two capacitors (2, 3) connected respectively to the two line wires (19) in order to assure, for the direct component of the current, isolation between the line wires (19) and the amplifier (20).

5. A circuit according to claim 4, in which there is provided a direct current feed source (70), isolated from the line (19), in order to feed the amplifier (20).

* * * * *